Patented Mar. 8, 1949

2,464,004

UNITED STATES PATENT OFFICE 2,464,004

STABLE QUINOLINE SALT FOR ELECTROLYSIS

Paul W. Stokesberry, Chicago, Ill., assignor to The Julep Company, Chicago, Ill., a corporation of Texas No Drawing. Original application July 24, 1944, Serial No. 546,436. Divided and this application March 31, 1945, Serial No. 586,019

1 Claim. (Cl. 260—286)

This application is a divisional application of the original application for patent on Process for the electrolytic synthesis of quinolinic acid and nicotinic acid Serial No. 546,436 filed in the United States Patent Office on July 24, 1944, now abandoned.

This invention relates to a stable quinoline salt for electrolysis.

Among the objects of my invention is to provide a stable quinoline salt that will not hydrolize and that is adapted for electrolysis and such other objects, advantages and capabilities as will later more fully appear and which are inherently possessed by my invention.

While I have disclosed herein preferred embodiments of my invention, yet it is understood that the same are susceptible of modification and change without departing from the spirit of my invention.

My stable quinoline salt is formed from a stable quinoline or quinoline structured salt by the reaction with quinoline, quinoline based alkaloids, and other compounds, the chemical structure of which contains the quinoline ring, in which the nitrogen linkages are such as to permit the quinoline structure to act as a strong tertiary base of a strong mineral acid such as sulphuric, nitric or the rapid reacting phosphoric which I prefer.

This salt is stabilized by the presence of an amine during the formation of the salt. This amine is non-specific and includes nearly all of the stable organic amines and the simplest of which, hydroxylamine is preferred as the hydroxyl group in this as well as the other complex amines aids the reaction.

The salt thus formed is preferably washed with alcohol or a mixture of alcohol and benzene, or alcohol and ether. The purity of the product is enhanced by recrystallizing the salt from alcohol but this is not absolutely essential to the reaction. The salt is then dried in a drying oven at a temperature range of 40 to 60 degrees centigrade.

My salt will not hydrolize and is adapted for electrolysis as fully set out in my co-pending application for patent on Process for the electrolytic synthesis of quinolinic acid and nicotinic acid Serial No. 546,436 of which this application is a divisional application.

Detailed instructions for making my salt are as follows: In this process I form a stable quinoline structured salt in the reaction between quinoline acting as a strong tertiary base, and phosphoric acid. The salt thus formed is stabilized during the reaction period by the presence of hydroxylamine.

Specifically the reaction is as follows: One liter of quinoline is added to 1 liter of ethyl alcohol, acting as solvent. Fifty-seven (57) grams of hydroxylamine are dissolved in this mixture by slight beating and stirring. To this mixture is added slowly and with stirring, 150 cc. of phosphoric acid. This mixture is stirred and allowed to cool until the salt forms.

The salt thus formed is preferably washed with alcohol or a mixture of alcohol and benzene, or alcohol and ether. The purity of the product is enhanced by recrystallizing the salt from alcohol. The salt is then dried in a drying oven at a temperature range of 40° to 60° centigrade.

Having thus described my invention, I claim:

A quinoline compound stable against hydrolysis obtained by reacting quinoline with an inorganic acid of the group consisting of sulphuric, nitric and phosphoric acids, and then reacting the salt obtained thereby with hydroxylamine.

PAUL W. STOKESBERRY.

REFERENCES CITED

The following references are of record in the file of this patent:

UNITED STATES PATENTS

| Number | Name | Date |
|---|---|---|
| 252,847 | Pickhardt | Jan. 24, 1882 |
| 254,097 | Pickhardt | Feb. 21, 1882 |
| 966,643 | Barr | Aug. 9, 1910 |
| 2,005,667 | Steinbrenck | June 18, 1935 |
| 2,041,436 | Schuleman et al. | May 19, 1936 |

FOREIGN PATENTS

| Number | Country | Date |
|---|---|---|
| 13,693 | Great Britain | A. D. 1891 |

OTHER REFERENCES

Chemiker-Zeitung, 1901, page 280.